S. HOLTON.
Transits.
No. 165,828. Patented July 20, 1875.
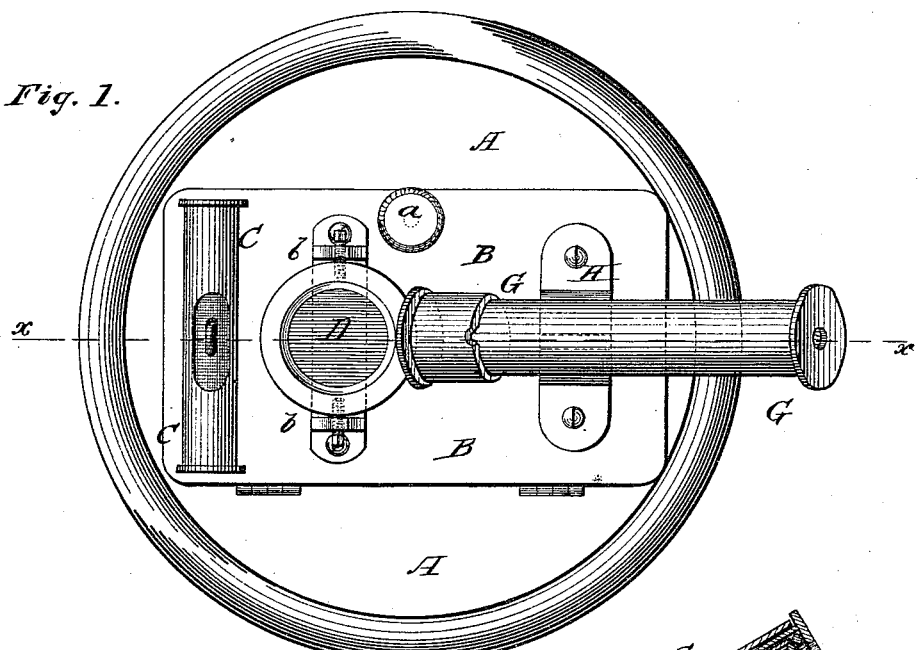
Fig. 1.
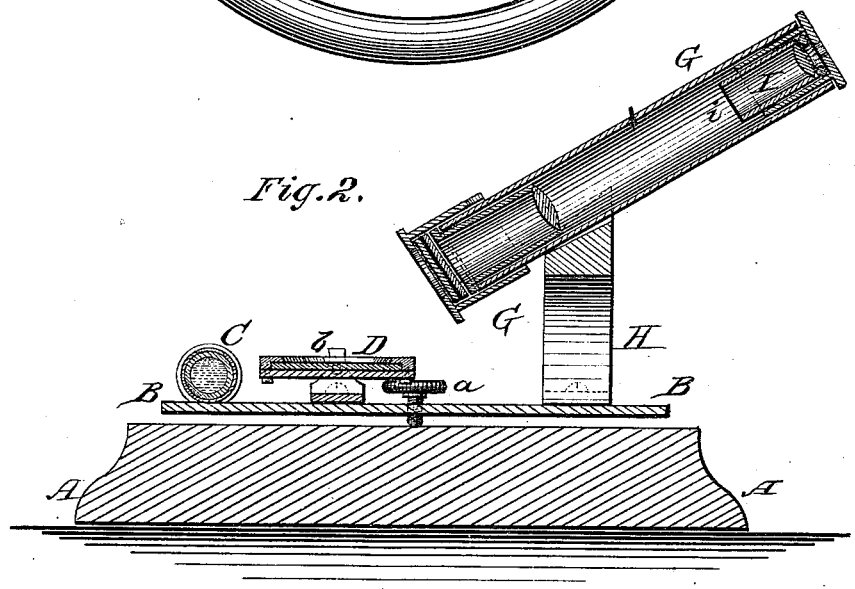
Fig. 2.
Fig. 3.
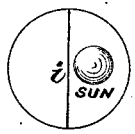
WITNESSES:
P. C. Dieterich
W. C. McArthur
INVENTOR
S. Holton
per T. H. Alexander
ATTORNEY.

UNITED STATES PATENT OFFICE.

SIMEON HOLTON, OF MIDDLEBURY, VERMONT.

IMPROVEMENT IN TRANSITS.

Specification forming part of Letters Patent No. 165,828, dated July 20, 1875; application filed June 26, 1875.

*To all whom it may concern:*

Be it known that I, S. HOLTON, of Middlebury, in the county of Addison and State of Vermont, have invented certain new and useful Improvements in Transits; and I do hereby declare that the following is a full, clear, and exact description thereof, reference being had to the accompanying drawings and to the letters of reference marked thereon, which form part of this specification.

The nature of my invention consists in the construction and arrangement of an instrument, called transit, for correcting mean time, or keeping a time-piece correct, as will be hereinafter more fully set forth.

In order to enable others skilled in the art to which my invention appertains to make and use the same, I will now proceed to describe its construction and operation, referring to the annexed drawing, in which—

Figure 1 is a plan view of my invention, and Fig. 2 is a longitudinal section of the same. Fig. 3 is a diagram of the reflected sun.

A represents the base of my instrument, on top of which is hinged a plate, B, adjusted by means of a set-screw, a, so as to level the plate. For this purpose a level, C, is made fast on or formed in the plate B. D represents a reflector, which is mounted on two pivots, b b, on the plate B, for the purpose of giving the reflector a rocking motion, so as to reflect the sun or any other object through the telescope G, which is mounted on a suitable stand, H.

In the focus of the eye-piece I of the telescope are one or more lines, i.

On the plate B I also propose to attach a compass, for the purpose of setting the instrument north or south.

The instrument being properly adjusted on the meridian, the sun, when it arrives at the meridian, will cast its rays on the reflector D, and then its image through the telescope G. As it passes over the field of the telescope it will come in contact with the line or lines i in the focus of the eye-piece, thus enabling any one to observe when the sun comes in contact and the time of its leaving. By observing the line or lines i, the true time may thus be judged.

Having thus fully described my invention, what I claim as new, and desire to secure by Letters Patent, is—

1. In a transit, the hinged plate B, supporting the telescope and reflector, and provided with the level C, and adjusted by means of the set-screw a, as and for the purposes set forth.

2. The combination, in a transit, of the hinged adjustable bed-plate B, rocking reflector D, and telescope G, as and for the purposes herein set forth.

3. The combination of the base A, hinged bed-plate B, with adjusting-screw a, level C, rocking reflector D, and telescope G, having one or more lines i, in focus of its eye-piece, all substantially as and for the purposes herein set forth.

In testimony that I claim the foregoing as my own I affix my signature in presence of two witnesses.

SIMEON HOLTON.

Witnesses:
R. M. BAILEY,
LYMAN E. KNAPP.